UNITED STATES PATENT OFFICE.

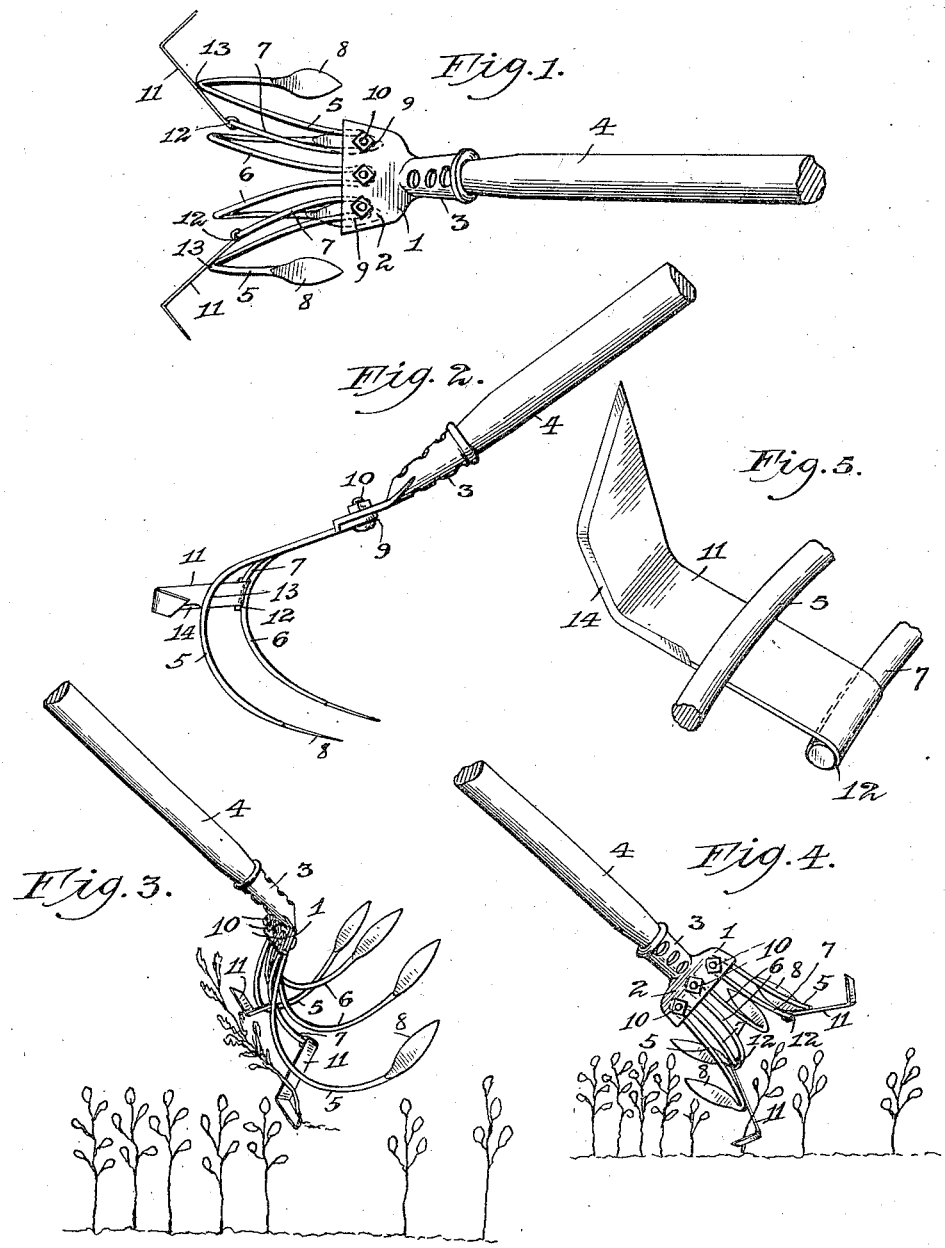

ALEXANDER S. BRADLEY, JR., OF LOCKE, WASHINGTON.

WEEDING AND CULTIVATING HOE.

1,182,451. Specification of Letters Patent. Patented May 9, 1916.

Application filed December 8, 1915. Serial No. 65,656.

*To all whom it may concern:*

Be it known that I, ALEXANDER S. BRADLEY, Jr., a citizen of the United States, residing at Locke, in the county of Pend Oreille and State of Washington, have invented certain new and useful Improvements in Weeding and Cultivating Hoes, of which the following is a specification.

This invention relates to improvements in weeding and cultivating hoes, and refers more specifically to hand implements of that type.

Among the salient objects of the invention are to provide a hand implement which can be operated with greater rapidity, and increased effectiveness and convenience, as compared with analogous tools of the prior art; to provide an implement by means of which thinning out from rows can be readily and accurately effected while cultivating between the rows and without requiring the operator to change his position as required for most satisfactorily doing the cultivating between the rows; to provide an implement so constructed that the operator may use it in its plant-thinning or weeding functions either as a shuffle or thrust hoe, or as an ordinary or chopping hoe; to provide an implement which is extremely simple in construction and in which the special weeding and thinning attachments are so mounted and disposed as to interfere as little as possible with the cultivating operations of the main hoe; so as to tend to keep themselves free from clogging and from contributing to the clogging of the main hoe; and in general, to provide an improved implement of the character referred to.

The invention will be readily understood from the following description, reference being had to the accompanying drawing, in which—

Figure 1 is a plan view of the implement held in operative position as illustrated in Fig. 2; the handle being broken off to reduce the size of the figure of the drawing; Fig. 2 is a side elevation of the implement as seen in Fig. 1; Fig. 3 shows the implement in reversed position and in perspective, illustrating one manner of using it in weeding or thinning; Fig. 4 is another perspective view illustrating another manner of using it in thinning or weeding; Fig. 5 is a detailed perspective view of one of the attachment blades whereby weeding and thinning operations are effected.

The particular embodiment of my invention herein illustrated and described is a practical and preferred embodiment of the invention, but is not to be regarded as the only form that the invention may take.

In said preferred construction 1 designates as a whole a metal body or casting, which may be termed the head of the tool and which comprises a flat part 2 and an integral socket part 3; the flat head-proper being disposed at an angle to the axis of the socket. The socket is adapted to receive an ordinary handle 4 in the usual manner. The head proper has attached thereto a series of cultivator tines, as 5, 5, 6, 6, and a pair of attachment-supporting tines 7, 7. Each cultivator tine terminates in a cultivator blade 8, preferably, and as herein shown, of spearhead shape, this being a common and satisfactory construction for performing the cultivating function of the tool. As a matter of structural simplicity and desirability, I form the attachment supporting tines 7 integrally with the respective adjacent cultivator tines 5; bending the two members so that they extend approximately parallel with each other and form loops 9 at the points where they are bent. These loops are used as means of securing the tines to the head part 2; bolts 10 being inserted through the respective loops and through the head member, the heads of which bolts underlie and clamp the loops to the under side of the part 2. This construction permits of adjustment of the tines as to their degree of divergence or spread, and also permits slight adjustment in the direction of the lengths of the tines.

Upon the end of each tine member 7 there is mounted a blade attachment 11, which blade attachments constitute the distinctive features of my invention. These blades are desirably formed of moderately wide strap metal, having one lateral edge sharpened throughout its operative length, and having an obliquely formed end margin which is also sharpened. At a point between its ends each attachment blade is bent substantially at right angles. In the preferred embodiment these blades are so mounted that when the hoe is held in operative position they will extend in an approximately horizontal direction, and will diverge outwardly and forwardly as to their main portions with their tips turned back substantially at right angles to their main bodies, all as shown clearly in Figs. 1 and 2. Their inner ends are reliably mounted upon, and attached to, the ends of the tines 7, as indicated at 12, and at points intermediate their lengths they rest against and are welded or brazed to the outer tines 5, as indicated at 13. When in the operative position shown in Figs. 1 and 2, it is the lower edges of these attachments which constitute the sharpened edges, as indicated at 14. When the tool is reversed, as indicated in Fig. 3, and is used as a shuffle hoe, what was before the lower edge now becomes the front edge, so that the tool will cut in thrusting forwardly. When the hoe is turned half way over, for example as illustrated in Fig. 4, the cutting edge faces near enough in the same general direction as the points of the cultivator teeth so that a horizontal chopping stroke, or a forward and downward thrust, will be effective in cutting out or uprooting plants or weeds.

The hooked shape of the attachment blades 11 and their relatively narrow form makes them extremely convenient and effective in selecting out weeds or plants interspersed with others, as, for example, in thinning out a row of plants or in cutting out weeds growing substantially in the row with the plants.

By reason of the fact that attachments are provided on each side of the hoe proper it is, of course, obvious, that the ground between a pair of rows may be cultivated, and thinning out or weeding out of the rows at each side readily accomplished, as the operator progresses along the row. The obliquely disposed cutting edge at the end of the attachment blade is likewise a matter of considerable importance, since this may be used as an extremely narrow bladed hoe which may be used to cut out weeds or plants in very narrow places between adjacent plants which are not to be disturbed or injured.

The fact that the blade attachments can be brought into use by simply tilting the hoe over onto one side or the other, and in that position using the tool with a true forward hoe-stroke, is a matter of comparatively great importance because the hoe can thus be rocked over to one side or the other as required with a minimum effort and indeed in the very act of making the stroke. This contributes greatly to the speed and ease of operation of the tool.

The attachments are so applied that they in nowise impair or interfere with the operation of the cultivator teeth when the hoe is used for the usual cultivating and weeding purposes.

It will be observed by reference to Fig. 3 that when the hoe is in reversed or up-side-down position the attachment blades project downwardly a substantial distance beyond the backs of the tines, while the extremities of the blades are turned so as to project obliquely upward. Because the blades are thus arranged it is very convenient to use the tool as a shuffle hoe for cultivating and weeding very close to a row of plants, and to do this in a very delicate manner at the time when the plants are very small. That is to say, the tool may be used as a shuffle hoe, utilizing only the weeding blades to cultivate narrow strips closely adjacent to the rows of plants, after which the intervening place may be hoed up rapidly and more recklessly without danger of injuring the plants. There are many other ways in which this implement may be effectively used which need not be mentioned in detail.

From the foregoing description it will be understood that an implement embodying my invention accomplishes fully the objects hereinbefore stated. It will be further understood that the details of construction, particularly of the hoe proper, may be modified without departing from the spirit of the invention or from the claims hereinafter appended. For example, the peculiarly constructed and arranged weeding blades of my invention may be applied to the ordinary solid blade chopping hoe which is in common use, without departing from the invention.

I claim as my invention:

1. A hand implement of the hoe type for cultivating and weeding, comprising a tool head and a handle attached thereto, the tool head comprising a group of curved tines having sharp terminals, and an auxiliary hooked blade mounted upon said tines and arranged to project laterally out beyond the group of tines, said blade being sharpened at one of its edges.

2. A weeding and cultivating hoe, comprising a hoe proper of the chopping type, and an auxiliary device consisting of a blade attached to the hoe proper and arranged to project laterally and forwardly beyond the latter, bent into hooked form as to its projecting part and sharpened at its lower edge.

3. A weeding and cultivating hoe, comprising a hoe proper of the chopping type, and auxiliary weeding blades, one at each side thereof, each consisting of a strap-like blade attached to the hoe proper and arranged to project laterally and forwardly beyond the hoe proper, each blade bent into hooked form and sharpened at its lower edge.

4. A weeding and cultivating hoe, comprising a hoe proper of the chopping type, consisting of a plurality of curved tines, the lateral outer ones of which extend as to their intermediate portions beyond or in advance of the inner tines, and auxiliary weeding blades, one at each side of the hoe proper, each attached at its inner end to a supporting tine, attached as to its intermediate portion to its outer tine, and projecting obliquely forwardly and laterally beyond the outer tine, re-curved into hooked form and sharpened as to its lower and lateral outer margins.

ALEXANDER S. BRADLEY. Jr.

Witnesses:
JOHN FRASER,
C. E. WILKERSON.

Copies of this patent may be obtained for five cents each, by addressing the "Commissioner of Patents, Washington, D. C."